US008503722B2

(12) United States Patent
Elwell et al.

(10) Patent No.: US 8,503,722 B2
(45) Date of Patent: Aug. 6, 2013

(54) METHOD AND SYSTEM FOR DETERMINING HOW TO HANDLE PROCESSING OF AN IMAGE BASED ON MOTION

(75) Inventors: Phil Elwell, Great Cambourne (GB); Naushirwan Patuck, Cambridge (GB); Benjamin Sewell, Truro (GB); David Plowman, Great Chesterford (GB)

(73) Assignee: Broadcom Corporation, Irvine, CA (US)

( * ) Notice: Subject to any disclaimer, the term of this patent is extended or adjusted under 35 U.S.C. 154(b) by 632 days.

(21) Appl. No.: 12/763,334

(22) Filed: Apr. 20, 2010

(65) Prior Publication Data

US 2011/0242344 A1    Oct. 6, 2011

Related U.S. Application Data

(60) Provisional application No. 61/319,971, filed on Apr. 1, 2010.

(51) Int. Cl.
*G06K 9/00*    (2006.01)
(52) U.S. Cl.
USPC ........................................ 382/103; 348/222.1
(58) Field of Classification Search
USPC ................ 382/103, 107; 348/220.1, 222.1
See application file for complete search history.

(56) References Cited

U.S. PATENT DOCUMENTS

| | | | |
|---|---|---|---|
| 2005/0201594 A1* | 9/2005 | Mori et al. | 382/107 |
| 2008/0037841 A1* | 2/2008 | Ogawa | 382/118 |
| 2009/0219412 A1* | 9/2009 | Nung | 348/231.99 |
| 2010/0177207 A1* | 7/2010 | Fukuda | 348/222.1 |
| 2011/0280446 A1* | 11/2011 | Steinberg et al. | 382/103 |

* cited by examiner

*Primary Examiner* — Andrew W Johns
(74) *Attorney, Agent, or Firm* — Brinks Hofer Gilson & Lione

(57) ABSTRACT

A mobile multimedia device may be operable to initiate capture of a series of image samples of a scene, where the scene may comprise one or more objects that may be identifiable by the mobile multimedia device. An image for the scene may be determined by the mobile multimedia device utilizing the captured image samples based on motion associated with the identifiable objects. As soon as the image for the scene has been determined, the capture of the series of image samples may be terminated. The image may be determined when the amount of motion associated with the identifiable objects is below a particular threshold value. The identifiable objects may comprise one or more faces. The motion may be due to a gesture such as a wink or a smile received from one or more of the faces. The image may be determined when the gesture is detected.

20 Claims, 4 Drawing Sheets

METHOD AND SYSTEM FOR DETERMINING HOW TO HANDLE PROCESSING OF AN IMAGE BASED ON MOTION

CROSS-REFERENCE TO RELATED APPLICATIONS/INCORPORATION BY REFERENCE

This patent application makes reference to, claims priority to, and claims benefit from U.S. Provisional Application Ser. No. 61/319,971, which was filed on Apr. 1, 2010.

The above stated application is hereby incorporated herein by reference in its entirety.

FIELD OF THE INVENTION

Certain embodiments of the invention relate to communication systems. More specifically, certain embodiments of the invention relate to a method and system for determining how to handle processing of an image based on motion.

BACKGROUND OF THE INVENTION

Image and video capabilities may be incorporated into a wide range of devices such as, for example, mobile phones, digital televisions, digital direct broadcast systems, digital recording devices, gaming consoles and the like. Mobile phones with built-in cameras, or camera phones, have become prevalent in the mobile phone market, due to the low cost of CMOS image sensors and the ever increasing customer demand for more advanced mobile phones with image and video capabilities. As camera phones have become more widespread, their usefulness has been demonstrated in many applications, such as casual photography, but have also been utilized in more serious applications such as crime prevention, recording crimes as they occur, and news reporting.

Historically, the resolution of camera phones has been limited in comparison to typical digital cameras, due to the fact that they must be integrated into the small package of a mobile handset, limiting both the image sensor and lens size. In addition, because of the stringent power requirements of mobile handsets, large image sensors with advanced processing have been difficult to incorporate. However, due to advancements in image sensors, multimedia processors, and lens technology, the resolution of camera phones has steadily improved rivaling that of some digital cameras.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for determining how to handle processing of an image based on motion, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for determining how to handle processing of an image based on motion. In various embodiments of the invention, a mobile multimedia device may be operable to initiate capture of a series of image samples of a scene, where the scene may comprise one or more objects that may be identifiable by the mobile multimedia device. An image for the scene may be determined by the mobile multimedia device, from the captured series of image samples, based on motion associated with one or more of the identifiable objects. As soon as the image for the scene has been determined, the capture of the series of image samples may be terminated. In this regard, the mobile multimedia device may be operable to compare a newly captured image sample with a previously captured consecutive image sample during the process of capturing a series of image samples. An amount of motion associated with one or more of the identifiable objects may then be determined based on the result of the comparison. In an exemplary embodiment of the invention, in instances when the determined amount of motion associated with one or more of the identifiable objects is below a particular threshold value, the newly captured image sample may be selected as the image for the scene. In this regard, for example, the particular threshold may be set in such a way that an image of the scene may be determined and/or recorded by the mobile multimedia device while one or more of the identifiable objects in the scene are still or are within tolerable amount of motion or movement.

The identifiable objects may comprise, for example, faces which may be identified utilizing face detection. The motion may be due to, for example, a gesture received from one or more of the identified faces. The gesture may comprise, for example, a wink and/or a smile. The smile may be identified, for example, utilizing smile detection.

In another exemplary embodiment of the invention, in instances when the determined amount of motion associated with one or more of the identifiable objects are above a particular threshold value, the newly captured image sample may be selected as the image for the scene. In this regard, for example, the particular threshold may be set in such a way that an image of the scene may be determined and/or recorded by the mobile multimedia device while a gesture such as, for example, a wink or a smile from one or more of the identified faces is detected.

Figure 1:
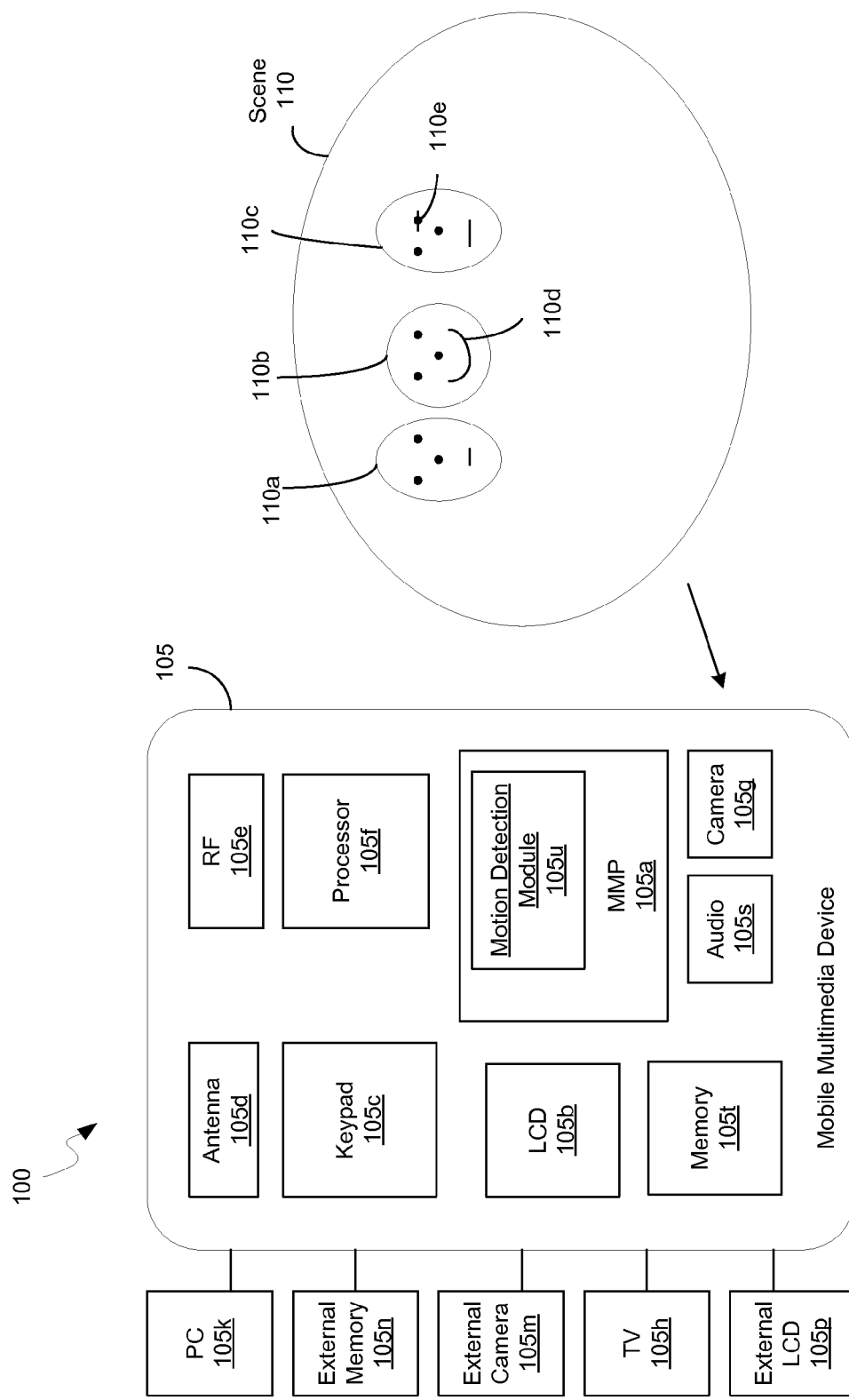
FIG. 1 is a block diagram illustrating an exemplary mobile multimedia system that is operable to determine how to handle processing of an image based on motion, in accordance with an embodiment of the invention.

FIG. 1 is a block diagram illustrating an exemplary mobile multimedia system that is operable to determine how to handle processing of an image based on motion, in accordance with an embodiment of the invention. Referring to FIG. 1, there is shown a mobile multimedia system 100. The mobile multimedia system 100 may comprise a mobile multimedia device 105, a TV 105*h*, a PC 105*k*, an external camera 105*m*, an external memory 105*n*, an external LCD display 105*p* and a scene 110. The mobile multimedia device 105 may be a mobile phone or other handheld communication device.

The mobile multimedia device 105 may comprise suitable logic, circuitry, interfaces and/or code that may be operable to communicate radio signals across a wireless communication network. The mobile multimedia device 105 may be operable to process image, video and/or multimedia data. The mobile multimedia device 105 may comprise a mobile multimedia processor (MMP) 105*a*, a memory 105*t*, a processor 105*f*, an antenna 105*d*, an audio block 105*s*, a radio frequency (RF) block 105*e*, an LCD display 105*b*, a keypad 105*c* and a camera 105*g*.

The mobile multimedia processor (MMP) 105*a* may comprise suitable logic, circuitry, interfaces, and/or code that may be operable to perform image, video and/or multimedia processing for the mobile multimedia device 105. For example, the MMP 105*a* may be designed and optimized for video record/playback, mobile TV and 3D mobile gaming. The MMP 105*a* may perform a plurality of image processing techniques such as, for example, filtering, demosaic, lens shading correction, defective pixel correction, white balance, image compensation, Bayer interpolation, color transformation and post filtering. The MMP 105*a* may also comprise integrated interfaces, which may be utilized to support one or more external devices coupled to the mobile multimedia device 105. For example, the MMP 105*a* may support connections to a TV 105*h*, an external camera 105*m*, and an external LCD display 105*p*. The MMP 105*a* may be communicatively coupled to the memory 105*t* and/or the external memory 105*n*. In an exemplary embodiment of the invention, the MMP 105*a* may be operable to determine and/or record an image of the scene 110 utilizing a series of captured image samples of the scene 110 based on motion associated with one or more identifiable objects in the scene 110. The identifiable objects may comprise, for example, the faces 110*a*-110*c*. The MMP 105*a* may comprise a motion detection module 105*u*.

The motion detection module 105*u* may comprise suitable logic, circuitry, interfaces and/or code that may be operable to detect motion such as, for example, a wink 110*e* or a smile 110*d* in the scene 110. The motion detection may be achieved by comparing the current image with a reference image and counting the number of different pixels.

The processor 105*f* may comprise suitable logic, circuitry, interfaces, and/or code that may be operable to control operations and processes in the mobile multimedia device 105. The processor 105*f* may be operable to process signals from the RF block 105*e* and/or the MMP 105*a*.

The memory 105*t* may comprise suitable logic, circuitry, interfaces and/or code that may be operable to store information such as executable instructions, data and/or database that may be utilized by the processor 105*f* and the multimedia processor 105*a*. The memory 105*t* may comprise RAM, ROM, low latency nonvolatile memory such as flash memory and/or other suitable electronic data storage.

In operation, the mobile multimedia device 105 may receive RF signals via the antenna 105*d*. Received RF signals may be processed by the RF block 105*e* and the RF signals may be further processed by the processor 105*f*. Audio and/or video data may be received from the external camera 105*m*, and image data may be received via the integrated camera 105*g*. During processing, the MMP 105*a* may utilize the external memory 105*n* for storing of processed data. Processed audio data may be communicated to the audio block 105*s* and processed video data may be communicated to the LCD 105*b*, the external LCD 105*p* and/or the TV 105*h*, for example. The keypad 105*c* may be utilized for communicating processing commands and/or other data, which may be required for image, audio or video data processing by the MMP 105*a*.

In an exemplary embodiment of the invention, the camera 105*g* may be operable to initiate capture of a series of image samples of the scene 110. For example, a shutter release button may be pressed to trigger the initiation of capturing the series of image samples of the scene 110. The scene 110 may comprise one or more objects such as the faces 110*a*-110*c* that may be identifiable by the MMP 105*a*. An image for the scene 110 may be determined by the MMP 105*a* utilizing the captured image samples based on motion associated with one or more of the identifiable objects such as the faces 110*a*-110*c*. As soon as the image for the scene 110 has been determined, the capture of the series of image samples may be terminated. In this regard, the MMP 105*a* may be operable to compare a newly captured image sample with a previously captured consecutive image sample during the process of capturing a series of image samples. An amount of motion associated with one or more of the identifiable objects such as the faces 110*a*-110*c* may then be determined by the motion detection module 105*u* in the MMP 105*a*, based on the result of the comparison.

In an exemplary embodiment of the invention, in instances when the determined amount of motion associated with one or more of the identifiable objects such as the faces 110*a*-110*c* are below a particular threshold value, the newly captured image sample may be selected as the image for the scene 110. In this regard, for example, the particular threshold may be set in such a way that an image of the scene 110 may be determined and/or recorded by the MMP 105*a* while one or more of the identifiable objects such as the faces 110*a*-110*c* in the scene 110 are still or are within a tolerable amount of movement. The camera 105*g* may operate in a number of different camera modes such as, for example, shutter priority mode, aperture priority mode, portrait mode, landscape mode or action mode. Accordingly, the threshold may be set differently for different camera modes. For example, instead of operating in the portrait mode, the camera 105*g* may operate in the action or sports mode. In this regard, for example, the threshold for the action mode may be set higher than or different from the threshold for the portrait mode.

An identifiable object in the scene 110 may comprise, for example, a face such as the face 110*a*, which may be identified employing face detection. The face detection may determine the locations and sizes of the faces 110*a*-110*c* such as human faces in arbitrary images. The face detection may detect facial features and ignore other items and/or features, such as buildings, trees and bodies. The motion may be due to, for example, a gesture received from one or more of the identified faces 110*a*-110*c*. The gesture may comprise, for example, a wink 110*e* and/or a smile 110*d*. The smile 110*d* may be identified, for example, employing smile detection. The smile detection may detect open eyes and/or upturned mouth associated with a smile such as the smile 110*d* in the scene 110.

In another exemplary embodiment of the invention, in instances when the determined amount of motion associated with one or more of the identifiable objects such as the faces 110*a*-110*c* are above a particular threshold value, the newly captured image sample may be selected as the image for the scene 110. In this regard, for example, the particular threshold may be set in such a way that an image of the scene 110 may be determined and/or recorded by the MMP 105*a* while a gesture such as, for example, a wink 110*e* or a smile 110*d* from one or more of the identified faces 110*a*-110*c* is detected. Depending on the camera mode in which the camera 105g may operate and/or the environmental conditions, the threshold may be set differently.

Figure 2:
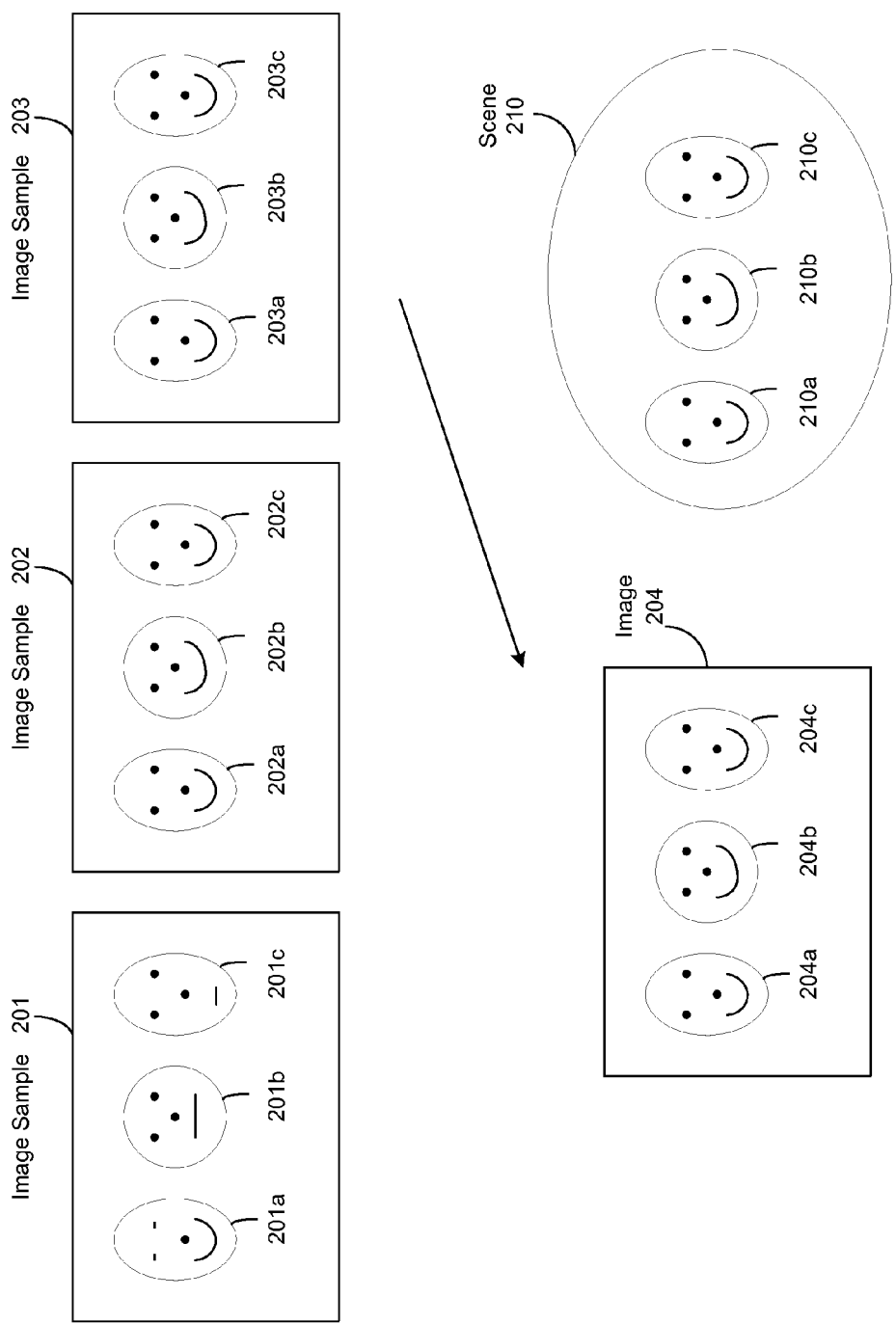
FIG. 2 is a block diagram illustrating an exemplary image of a scene that is determined based on tolerable amount of motion associated with identifiable objects, in accordance with an embodiment of the invention.

FIG. 2 is a block diagram illustrating an exemplary image of a scene that is determined based on tolerable amount of motion associated with identifiable objects, in accordance with an embodiment of the invention. Referring to FIG. 2, there is shown a series of image samples of a scene such as the scene 210, of which image samples 201, 202, 203 are illustrated and an image 204 of the scene 210. The scene 210 may comprise a plurality of identifiable objects, of which the faces 210a, 210b, 210c are illustrated. The image sample 201 may comprise a plurality of faces, of which the faces 201a, 201b, 201c are illustrated. The image sample 202 may comprise a plurality of faces, of which the face 202a, 202b, 202c are illustrated. The image sample 203 may comprise a plurality of faces, of which the faces 203a, 203b, 203c are illustrated. The image 204 may comprise a plurality of faces, of which the faces 204a, 204b, 204c are illustrated.

After the camera 105g initiates capture of a series of image samples, the image sample 201 is captured first and the image sample 202 is captured next. In an exemplary embodiment of the invention, the MMP 105a may be operable to compare the image sample 202 with the image sample 201. For example, the faces 202a, 202b, 202c in the image sample 202 are compared with the faces 201a, 201b, 201c in the image sample 201, respectively. As illustrated in FIG. 2, a large amount of motion, which is above a particular threshold value for a portrait, may be detected or determined by the motion detection module 105u in the MMP 105a. The amount of motion may be due to, for example, opening of eyes on the face 202a, and changing to smiles on the faces 202b and 202c. Since the amount of motion is above the particular threshold value, the image sample 203 is then captured during the process of capturing the series of image samples. The MMP 105a may then be operable to compare the image sample 203 with the image sample 202. For example, the faces 203a, 203b, 203c in the image sample 203 are compared with the faces 202a, 202b, 202c in the image sample 202, respectively. As illustrated in FIG. 2, the result of the comparison between the image sample 203 and the image sample 202 may indicate that the faces 203a, 203b, 203c may be still or there may be a small amount of motion, which is detected by the motion detection module 105u. The amount of motion that is detected may be below the particular threshold value for a portrait. Accordingly, the image sample 203 may be selected as the image 204 for the scene 210. The capture of the series of the image samples may then be terminated.

In the exemplary embodiment of the invention illustrated in FIG. 2, there are shown three faces 210a-210c in the scene 210, three image samples 201, 202, 203, and three faces on an image sample such as the faces 201a-201c on the image sample 201. Notwithstanding, the invention is not so limited. The number of the image samples and the number of the faces may be different. Different identifiable objects in the scene 210 may be illustrated.

Figure 3:
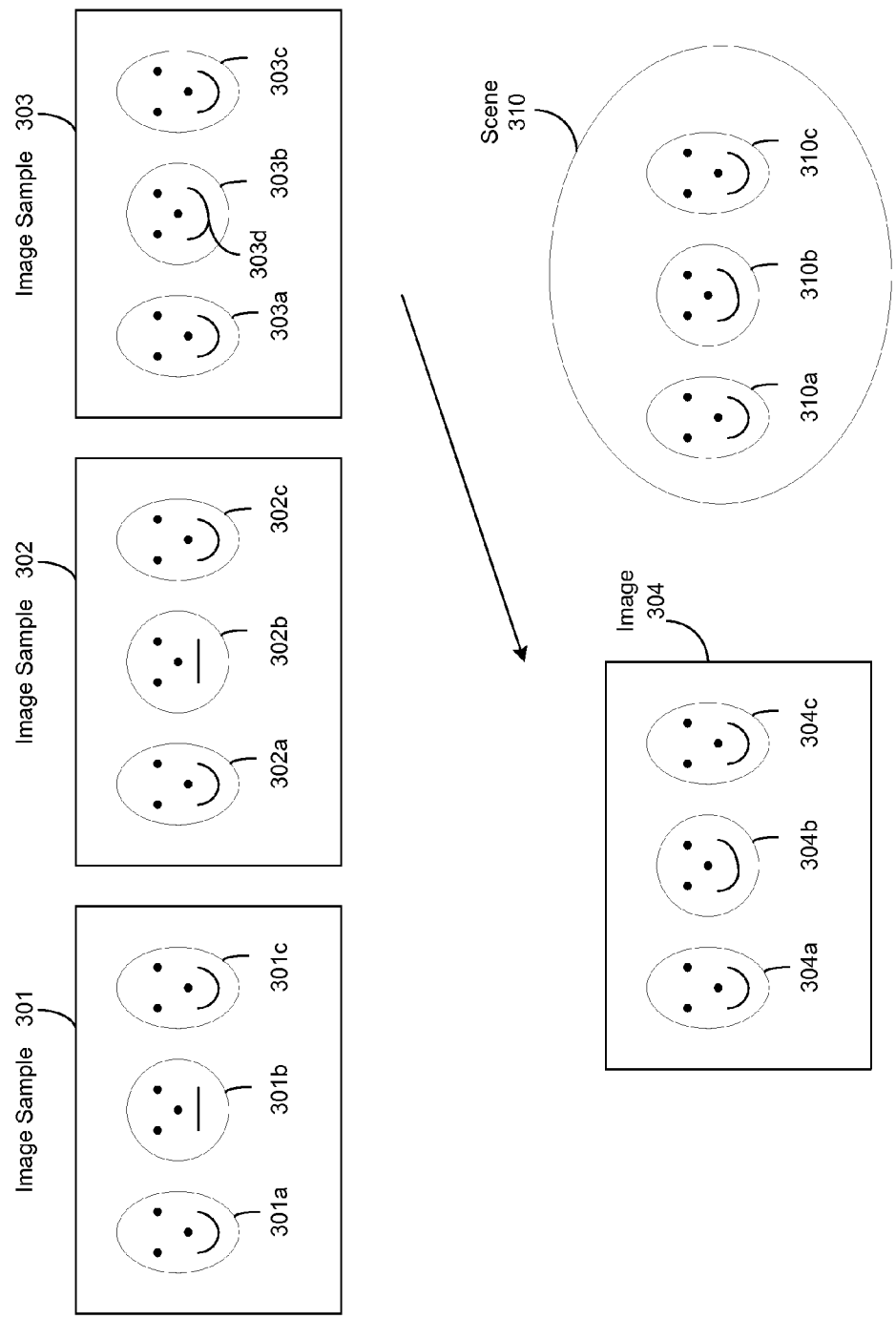
FIG. 3 is a block diagram illustrating an exemplary image of a scene that is determined based on a gesture received from an identifiable object, in accordance with an embodiment of the invention.

FIG. 3 is a block diagram illustrating an image of a scene that is determined based on a gesture received from an identifiable object, in accordance with an embodiment of the invention. Referring to FIG. 3, there is shown a series of image samples of a scene such as the scene 310, of which image samples 301, 302, 303 are illustrated and an image 304 of the scene 310. The scene 310 may comprise a plurality of identifiable objects, of which the faces 310a, 310b, 310c are illustrated. The image sample 301 may comprise a plurality of faces, of which the faces 301a, 301b, 301c are illustrated. The image sample 302 may comprise a plurality of faces, of which the face 302a, 302b, 302c are illustrated. The image sample 303 may comprise a plurality of faces, of which the faces 303a, 303b, 303c are illustrated. The image 304 may comprise a plurality of faces, of which the faces 304a, 304b, 304c are illustrated.

After the camera 105g initiates capture of a series of image samples, the image sample 301 is captured first and the image sample 302 is captured next. In an exemplary embodiment of the invention, the MMP 105a may be operable to compare the image sample 302 with the image sample 301. For example, the faces 302a, 302b, 302c in the image sample 302 are compared with the faces 301a, 301b, 301c in the image sample 301 respectively. As illustrated in FIG. 3, the result of the comparison between the image sample 302 and the image sample 301 may indicate that the faces 302a, 302b, 302c may be still or possess a tolerable amount of motion. The amount of motion may be detected by the motion detection module 105u. In this regard, the motion detection module 105u may be operable to determine that the amount of motion this is detected is below a particular threshold value. Since the amount of motion is below the particular threshold value, a gesture from one of the faces 302a, 302b, 302c may not be detected by the motion detection module 105u. Accordingly, the image sample 303 is then captured during the process of capturing the series of image samples.

The MMP 105a may then be operable to compare the image sample 303 with the image sample 302. For example, the faces 303a, 303b, 303c in the image sample 303 are compared with the faces 302a, 302b, 302c in the image sample 302, respectively. As illustrated in FIG. 3, a large amount of motion, which is above the particular threshold value for a portrait, may be detected or determined by the motion detection module 105u in the MMP 105a. The amount of motion may be due to a gesture such as, for example, due to the smile 303d on the face 303b. Since the amount of motion is above the particular threshold value due to the gesture such as the smile 303d, the image sample 303 may be selected as the image 304 for the scene 310. The capture of the series of image samples may then be terminated.

In the exemplary embodiment of the invention illustrated in FIG. 3, there are shown three faces 310a-310c in the scene 310, three image samples 301, 302, 303, and three faces on an image sample such as the faces 301a-301c on the image sample 301. Notwithstanding, the invention is not so limited. The number of the image samples and the number of the faces may be different. Different identifiable objects and different gestures in the scene 310 may be illustrated.

Figure 4:
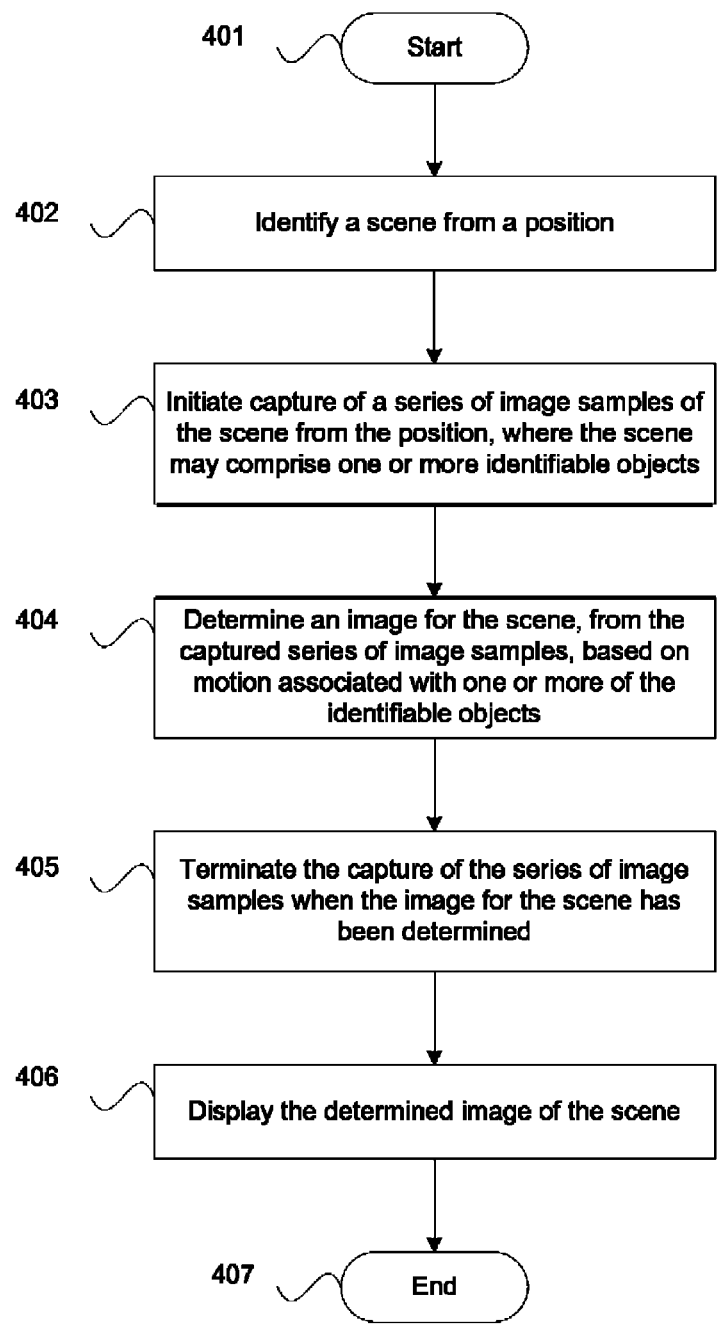
FIG. 4 is a flow chart illustrating exemplary steps for determining how to handle processing of an image based on motion, in accordance with an embodiment of the invention.

FIG. 4 is a flow chart illustrating exemplary steps for determining how to handle processing of an image based on motion, in accordance with an embodiment of the invention. Referring to FIG. 4, the exemplary steps start at step 401. In step 402, the mobile multimedia device 105 may be operable to identify a scene 110 from a position or particular viewing angle. In step 403, the camera 105g in the mobile multimedia device 105 may be operable to initiate capture of a series of image samples 201, 202, 203, of the scene 210 from the position or viewing angle, where the scene 210 may comprise one or more identifiable objects such as the faces 210a-210c. In step 404, the MMP 105a in the mobile multimedia device 105 may be operable to determine and/or record an image 204 for the scene 210, from the captured series of image samples 201, 202, 203, based on motion associated with one or more of the identifiable objects such as the faces 210a-210c. In step 405, the capture of the series of image samples may be terminated when the image 204 for the scene 210 has been determined. In step 406, the LCD 105b in the mobile multimedia device 105 may be operable to display the determined image 204 of the scene 210. The exemplary steps may proceed to the end step 407.

In various embodiments of the invention, a camera 105g in a mobile multimedia device 105 may be operable to initiate capture of a series of image samples such as the image samples 201, 202, 203 of a scene 210. The scene 210 may comprise one or more objects that may be identifiable by the MMP 105a in the mobile multimedia device 105. An image such as the image 204 to be created for the scene 210 may be determined by MMP 105a in the mobile multimedia device 105, from the captured series of image samples 201, 202, 203, based on motion associated with one or more of the identifiable objects. As soon as the image 204 for the scene 210 has been determined, the capture of the series of image samples may be terminated. In this regard, the MMP 105a in the mobile multimedia device 105 may be operable to compare a newly captured image sample such as the image sample 203 with a previously captured consecutive image sample such as the image sample 202 during the process of capturing the series of image samples 201, 202, 203. An amount of motion associated with one or more of the identifiable objects may then be determined by the motion detection module 105u based on the result of the comparison.

In an exemplary embodiment of the invention, in instances when the determined amount of motion associated with one or more of the identifiable objects such as the faces 203a, 203b, 203c is below a particular threshold value, the newly captured image sample 203 may be selected as the image 204 for the scene 210. In this regard, for example, the particular threshold may be set in such a way that an image 204 of the scene 210 may be determined by the MMP 105a while one or more of the identifiable objects such as the faces 203a, 203b, 203c in the scene 210 are still or are within tolerable amount of motion or movement.

The identifiable objects may comprise, for example, faces 110a-110c which may be identified utilizing face detection. The motion may be due to, for example, a gesture received from one or more of the identified faces 110a-110c. The gesture may comprise, for example, a wink 110e and/or a smile 110d. The smile 110d may be identified, for example, utilizing smile detection.

In another exemplary embodiment of the invention, in instances when the determined amount of motion associated with one or more of the identifiable objects such as the faces 303a, 303b, 303c is above a particular threshold value, the newly captured image sample such as the image sample 303 may be selected as the image 304 for the scene 310. In this regard, for example, the particular threshold may be set in such a way that an image 304 of the scene 310 may be determined by the MMP 105a in the mobile multimedia device 105 while a gesture such as, for example, a smile 303d from the identified face 303b is detected.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for determining how to handle processing of an image based on motion.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing images, the method comprising:
   in a mobile multimedia device:
   initiating capture of a series of image samples of a scene, wherein said scene comprises one or more objects that are identifiable by said mobile multimedia device;
   determining an image from said captured series of image samples based on motion associated with said one or more identifiable objects exceeding a particular motion threshold value;
   terminating said capture of said series of image samples when said image for said scene has been determined.

2. The method according to claim 1, comprising comparing a newly captured one of said series of image samples with a previously captured consecutive one of said series of image samples during said capture of said series of image samples.

3. The method according to claim 2, comprising determining an amount of motion associated with said one or more identifiable objects based on said comparison.

4. The method according to claim 3, comprising selecting said newly captured one of said series of image samples as said image for said scene when said determined amount of motion is below a particular threshold value.

5. The method according to claim 1, wherein said scene comprises one or more faces as said identifiable objects.

6. The method according to claim 5, comprising identifying said one or more faces for each of said captured series of image samples utilizing face detection.

7. The method according to claim 5, wherein said motion comprises a gesture received from one or more of said faces.

8. The method according to claim 7, wherein said gesture comprises a wink and/or a smile.

9. The method according to claim 8, comprising identifying said smile for each of said captured series of image samples utilizing smile detection.

10. The method according to claim 1, wherein the particular threshold value is set according to a plurality of camera modes.

11. A system for processing images, the system comprising:
one or more processors and/or circuits for use in a mobile multimedia device, said one or more processors and/or circuits being operable to:
initiate capture of a series of image samples of a scene, wherein said scene comprises one or more objects that are identifiable by said mobile multimedia device;
determine an image from said captured series of image samples based on motion associated with said one or more identifiable objects below a particular motion threshold value; and
terminate said capture of said series of image samples when said image for said scene has been determined.

12. The system according to claim 11, wherein said one or more processors and/or circuits are operable to compare a newly captured one of said series of image samples with a previously captured consecutive one of said series of image samples during said capture of said series of image samples.

13. The system according to claim 12, wherein said one or more processors and/or circuits are operable to determine an amount of motion associated with said one or more identifiable objects based on said comparison.

14. The system according to claim 13, wherein said one or more processors and/or circuits are operable to select said newly captured one of said series of image samples as said image for said scene when said determined amount of motion is below a particular threshold value.

15. The system according to claim 11, wherein said scene comprises one or more faces as said identifiable objects.

16. The system according to claim 15, wherein said one or more processors and/or circuits are operable to identify said one or more faces for each of said captured series of image samples utilizing face detection.

17. The system according to claim 15, wherein said motion comprises a gesture received from one or more of said faces.

18. The system according to claim 17, wherein said gesture comprises a wink and/or a smile.

19. The system according to claim 18, wherein said one or more processors and/or circuits are operable to identify said smile for each of said captured series of image samples utilizing smile detection.

20. The system according to claim 11, wherein the particular threshold value is set according to a plurality of camera modes.

* * * * *